No. 728,667. Patented May 19, 1903.

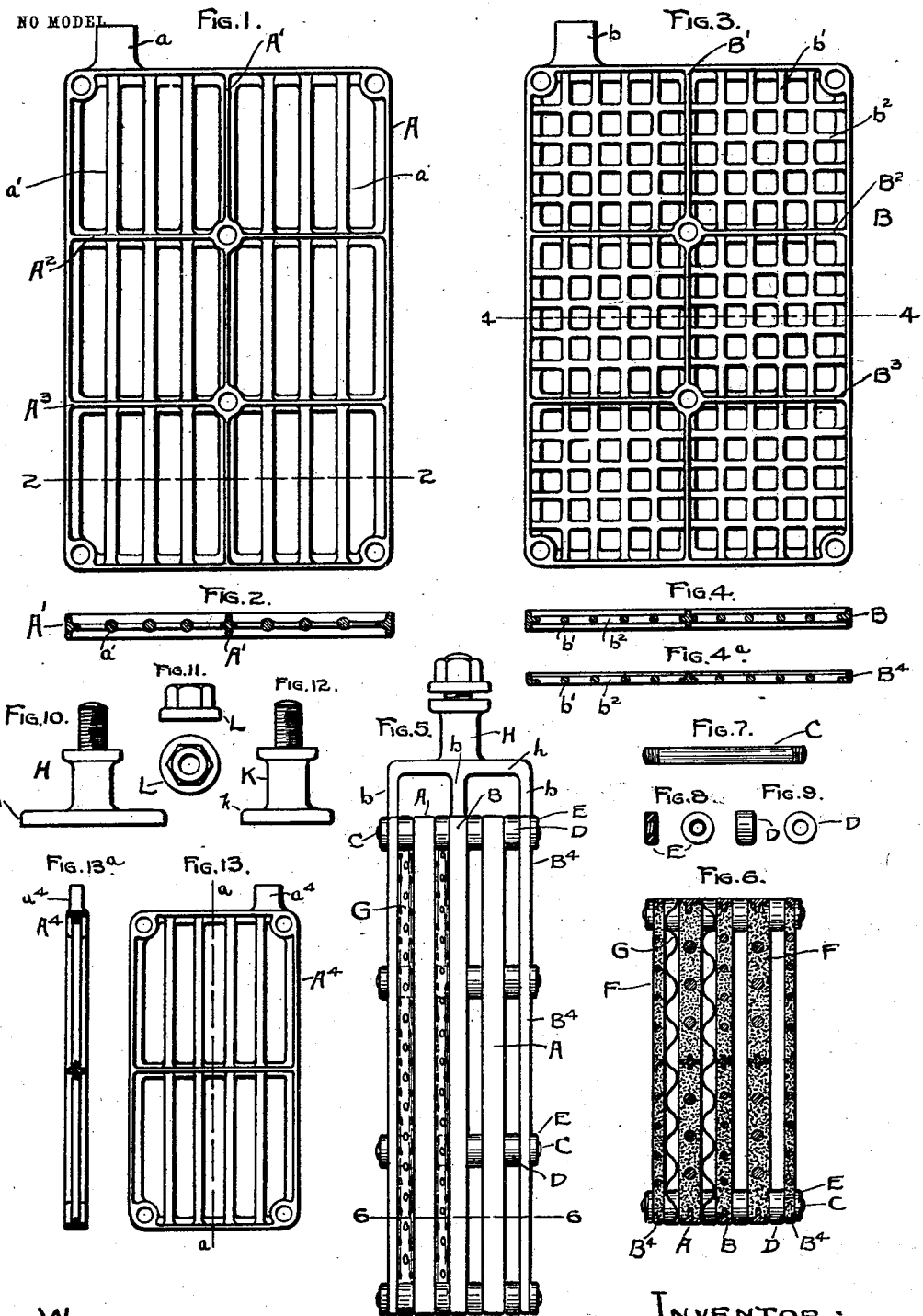

UNITED STATES PATENT OFFICE.

JOHN C. BROCKSMITH, OF CHICAGO, ILLINOIS.

STORAGE BATTERY.

SPECIFICATION forming part of Letters Patent No. 728,667, dated May 19, 1903.

Application filed January 14, 1902. Serial No. 89,704. (No model.)

*To all whom it may concern:*

Be it known that I, JOHN C. BROCKSMITH, a citizen of the United States, residing at Chicago, county of Cook, State of Illinois, have invented a certain new and useful Improvement in Storage Batteries; and I declare the following to be a full, clear, and exact description of the invention, such as will enable others skilled in the art to which it pertains to make and use the same, reference being had to the accompanying drawings, which form a part of this specification.

My invention relates in general to storage batteries, and more particularly to lead-peroxid sulfuric-acid metallic-lead type, in which the active material is mechanically applied to metallic supporting and conducting grids.

The primary object of my invention is to produce a storage battery of the type referred to which will have a large output or capacity per unit of weight of the complete battery.

I accomplish the above object by greatly increasing the proportion of active material present in the plate relatively to the weight and volume of the grid without injuriously affecting the durability of the plate.

My invention, generally stated, consists in a storage battery of the class mentioned in which the grids comprise frames for supporting the active material and conducting-rods embedded in the active material and in which the plates formed of the grids and active material are spaced apart by washers made of insulating material and being united by insulating-rods passing through the plates and washers.

My invention will be more fully described hereinafter with reference to the accompanying drawings, in which the same is illustrated as embodied in a convenient and practical form, and in which—

Figure 1 is an elevational view of a positive-pole grid; Fig. 2, a cross-section of the positive-pole grid on line 2 2 of Fig. 1; Fig. 3, an elevational view of a negative-pole grid; Fig. 4, a cross-section of the negative-pole grid on line 4 4 of Fig. 3; Fig. 4$^a$, a view, similar to Fig. 4, of the outer negative-pole grids of an element; Fig. 5, an edge elevational view of the grids assembled to form an element; Fig. 6, a sectional view on line 6 6 of Fig. 5; Fig. 7, a detail view of one of the connecting-rods; Figs. 8 and 9, detail views of the insulating washers and nuts; Figs. 10 and 12, detail views of the terminals for uniting the positive-pole and negative-pole plates, respectively. Fig. 11 shows the binding-nut in elevation and plan; Fig. 13, an elevational view of a modified form of the positive-pole grid, and Fig. 13$^a$ a vertical section on line $a\,a$ of Fig. 13.

Similar reference characters are used to designate similar parts in the several figures of the drawings.

Reference-letter A indicates the positive-pole grid, which comprises an outer frame, preferably of T-shaped cross-section. In order to stiffen and strengthen the open frame A, a vertical rib A' and cross-ribs A$^2$ and A$^3$ may be provided, preferably of L-shaped cross-section. Bosses are provided at the corners of the frame and also at the points of intersection of the vertical and transverse strengthening-ribs, through which holes are formed when the grid is cast or in any suitable manner—as, for instance, by drilling or punching. A plurality of conducting-rods $a'$, preferably extending in the direction of the grid's greatest length and terminating in the frame, are provided, which serve to conduct the current to and from the active material, which is supported within the outer frame and which surrounds the conducting-rods $a'$. The conducting-rods $a'$ are formed of a smaller diameter than the depth of the frame A and are spaced at a comparatively great distance apart in order to reduce the amount of metal in the grid without reducing the cross-section of the conductors.

Reference-letter B indicates one of the negative-pole grids, which is similar to the positive-pole grid in size, but somewhat lighter in section and of a less depth. In practice I have found that a negative-pole plate seventy-five to eighty per cent. of the thickness of a positive-pole plate gives good results and does not seriously affect the capacity of the battery, while reducing the weight thereby considerably. A vertical strengthening-rib B' and horizontal ribs B$^2$ and B$^3$ may be provided in order to give greater rigidity to the grid.

$b'$ indicates a series of conductors extending in the direction of the greatest length of the grid, while $b^2$ indicates a series of conductors extending at right angle to the conductors $b'$. The conductors $b'$ and $b^2$ on the negative-pole grid may be much thinner than the conducting-rods on the positive-pole grid, as the negative-pole grid is subjected to little, if any, electrolytic deterioration, and by arranging the conductors $b'$ and $b^2$ to extend in both directions and spacing them comparatively close together a more uniform distribution of the current over the surface of the plate is obtained, which facilitates the "forming" of the active material, it being unnecessary, however, to arrange the conductors $a'$ of the positive-pole plate as close together, as the material thereon forms readily in spite of the relatively greater distance between the conductors. The negative-pole grids are also provided with bosses disposed similarly to the bosses on the positive-pole grids and are provided with apertures also adapted to aline with the apertures through the bosses on the positive-pole grid.

The positive-pole and negative-pole grids are preferably formed by casting, and the material of which they are formed is preferably antimonious lead containing approximately ten per cent. antimony. As this material has considerable amount of rigidity, is fairly elastic, and is not easily attacked by the acid solution, it is well adapted for use in a storage battery of the design shown. Any metal, however, having similar qualities may, if desired, be used. The material which is placed upon the positive-pole grids and which during the process of formation becomes the active material consists principally of red lead, (minium,) with a slight admixture of litharge. This mixture of lead oxids is moistened with a saturated solution of ammonium sulfate and while in a plastic condition is placed within the grid, so as to stand flush or slightly above the edges of the rectangular frame and so as to be of substantially the same thickness throughout. The conducting-rods $a'$ are embedded within the plastic material. The grid and its contained material are preferably subjected to considerable pressure between layers of absorbent material, such as blotting-paper, which removes the surplus moisture and serves to compress the material. The plate is then laid aside to harden and dry. The material placed upon the negative-pole grid is preferably composed of litharge with a slight admixture of minium, which is moistened with a very dilute solution of sulfuric acid. The material is placed upon a negative-pole grid in a somewhat similar manner to that above described for placing the active material upon a positive-pole grid.

In Fig. 4$^a$ I have shown the end negative-pole grids of an element, which are only about half the thickness of the ordinary negative-pole grids, inasmuch as they are active on one surface only—namely, that facing the adjacent positive plate—and hence require only half the active material in them.

After the positive-pole and negative-pole plates have been prepared, preferably in the manner above described, a sufficient number of them are assembled to form a complete element, such as shown in Fig. 5, in which there are five plates, two of which are positive pole. The plates are arranged with the holes through the bosses registering, so that connecting-rods C, preferably formed of insulating material, may be passed through the openings and secured by any suitable means fixed to the opposite ends of the rod—such, for instance, as nuts E, preferably also formed of insulating material. The plates are spaced apart by interposed washers D, which are also formed of insulating material and are preferably perforated, so they may surround the connecting-rods C. Separators G of any suitable form and material are preferably located between the adjacent faces of the plates in order to prevent the active material from becoming dislodged. When the plates have been assembled and properly spaced and bound together in the manner described, the positive plates A A are connected in multiple by a terminal—such, for instance, as shown in Fig. 12—comprising a horizontal portion $k$, which is suitably secured to the lugs $a$ $a$, projecting from the positive plates. The negative-pole plates B$^4$, B, and B$^4$ are also electrically united by a terminal H, (shown in Fig. 10,) which comprises a horizontal portion $h$, which is suitably secured to the lugs $b$, projecting from the several negative plates. A nut L (shown in Fig. 11) is adapted to be screwed upon each of the terminals, so as to bind a conductor to each of the terminals. These terminals are preferably cast separate from the grids and secured to the lugs by soldering, burning, or otherwise, the preferable manner of attaching the terminals, however, being to first dress off the tops of the lugs squarely and to an even height and then place the horizontal portion of the terminal against the ends of the lugs, to which it is then soldered. The terminals and joints are preferably covered with several layers of acid-proof compound of any approved kind in order to protect the same from corrosion by the electrolyte.

In Figs. 13 and 13$^a$ I have shown a modified positive-pole grid A$^4$ of a design appropriate for a smaller-sized cell, where it is unnecessary to use the vertical strengthening-rib and more than one horizontal strengthening-rib. $a^4$ indicates the lug for electrically connecting the grid to a terminal.

When the several plates have been completed, preferably in the manner above described, and assembled so as to constitute an element, the latter is "formed" by the passage of a continuous current in one direction through the element until all the material on the positive-pole plate has been oxidized to peroxid of lead and all that on the negative-pole plate has been reduced to metallic lead in a porous and finely-divided form in a manner well known in the art of storage batteries.

I have found in practice that the embedding of the conductors in the active material is of great advantage, inasmuch as they are protected to a considerable extent from electrolytic action. Another advantage resulting from this construction is that a continuous surface of active material is exposed to the electrolyte, thus giving a maximum amount of surface for action by the electrolyte upon the active material. On the other hand I have found that if the conducting parts of the grid are exposed to the direct action of the electrolyte they are rapidly consumed by electrolytic action and the life of such parts is therefore very limited, and thus they are made large in cross-section in other forms of storage batteries.

In order to entirely prevent the deterioration of the outer edges of the frame of the grids, I preferably coat the same with acid-proof paint, coal-tar, or other similar substance, which will prevent contact between the electrolyte and the exterior of the metallic frame.

While I have described more or less precisely the details of construction, I do not wish to be understood as limiting myself thereto, as I contemplate changes in form, the proportion of parts, and the substitution of equivalents, as circumstances may suggest or render expedient, without departing from the spirit of my invention.

Having now fully described my invention, what I claim as new, and desire to secure by Letters Patent, is—

1. A supporting and conducting grid for storage batteries comprising a rectangular metallic frame of T-shaped cross-section provided at its corners with bosses having holes therethrough, the vertical faces of said bosses being flush with the edges of the frame.

2. In a storage battery, the combination with a plurality of grids comprising metallic frames of T-shaped cross-section provided at their corners with bosses having holes therethrough, the vertical faces of said bosses being flush with the edges of the frames, of insulating-rods passing through said holes and thereby uniting the grids.

3. In a storage battery, the combination with a plurality of grids comprising metallic frames of T-shaped cross-section provided with suitably-disposed bosses having holes therethrough, the vertical faces of said bosses being flush with the edges of the frames; of insulating perforated washers interposed between said grids and located in alinement with said bosses, and insulating-rods passing through the holes in the grids and perforations in said washers.

4. In a supporting and conducting grid for storage batteries, the combination with a metallic frame, of suitably-disposed bosses on said frame having holes therethrough, and a plurality of conductor-rods of circular cross-section and of relatively less diameter than the depth of the frame, said rods extending both longitudinally and laterally within the frame.

5. In a storage battery, the combination with a plurality of plates each comprising a frame of T-shaped cross-section having conductor-rods of relatively less diameter than the depth of the frame and an active material surrounding the conductor-rods, and also surrounding the longitudinal flanges of the T-shaped frame and thereby supported within the frame, of insulating-washers interposed between said plates and located in alinement with said bosses, and insulating connecting-rods passing through the plates and interposed washers.

6. In a storage battery, the combination with a plurality of plates each comprising a metallic frame of T-shaped cross-section having conductor-rods of relatively less diameter than the depth of the frame and an active material surrounding the conductor-rods, and also surrounding the longitudinal flanges of the T-shaped frame and thereby supported within the frame, of separating material interposed between said plates to prevent dislodgment of the active material thereon and its contact with plates of opposite polarity, means for spacing said plates apart, and means insulated from the plates for uniting the same.

7. In a storage battery, the combination with a plurality of plates each comprising a frame having conductor-rods of relatively less diameter than the depth of the frame, and an active material supported within the frame and surrounding the conductor-rods, of insulating-washers interposed between and spacing apart said plates, insulating connecting-rods passing through the plates and interposed washers, thereby uniting the plates, and separating material located between adjacent plates within the space formed by said washers to prevent the dislodgment of the active material and its contact with plates of opposite polarity.

In testimony whereof I sign this specification in the presence of two witnesses.

J. C. BROCKSMITH.

Witnesses:
GEO. L. WILKINSON,
CLARA C. CUNNINGHAM.